United States Patent
Yang

(10) Patent No.: US 10,169,026 B2
(45) Date of Patent: ***Jan. 1, 2019

(54) TRANSFERRING OPERATING ENVIRONMENT OF REGISTERED NETWORK TO UNREGISTERED NETWORK

(71) Applicant: KT CORPORATION, Gyeonggi-do (KR)

(72) Inventor: Jeong-Yeop Yang, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/790,765

(22) Filed: Oct. 23, 2017

(65) Prior Publication Data

US 2018/0046445 A1 Feb. 15, 2018

Related U.S. Application Data

(63) Continuation of application No. 15/136,964, filed on Apr. 24, 2016, now Pat. No. 9,798,533, which is a (Continued)

(30) Foreign Application Priority Data

Sep. 12, 2013 (KR) ........................ 10-2013-0109839

(51) Int. Cl.
*H04W 4/00* (2018.01)
*G06F 8/61* (2018.01)
(Continued)

(52) U.S. Cl.
CPC ............ *G06F 8/63* (2013.01); *H04L 12/2803* (2013.01); *H04L 12/2809* (2013.01);
(Continued)

(58) Field of Classification Search
CPC ....................................................... G06F 8/63
(Continued)

(56) References Cited

U.S. PATENT DOCUMENTS 2,883,255 A 4/1959 Anderson
3,882,305 A 5/1975 Johnstone
(Continued)

FOREIGN PATENT DOCUMENTS

JP 11-184660 A 7/1999
JP 2005-340881 A 12/2005
(Continued)

*Primary Examiner* — Santiago Garcia
(74) *Attorney, Agent, or Firm* — IP Legal Services, LLC

(57) ABSTRACT

The disclosure is related to providing an operation environment of a registered network having first devices to a user in an unregistered network having second devices. In order to provide, the second devices in the unregistered network may be detected when user equipment associated with the user enters a service area of the unregistered network. As compatible devices, devices compatible with the first devices in the registered network may be selected from the detected second devices. Then, system images of the first devices compatible with the selected compatible devices may be obtained. The obtained system images of the first devices may be installed at the selected compatible devices, respectively.

16 Claims, 9 Drawing Sheets

Related U.S. Application Data continuation of application No. 14/484,594, filed on Sep. 12, 2014, now Pat. No. 9,326,126.

(51) Int. Cl.
| | |
|---|---|
| *H04W 8/12* | (2009.01) |
| *H04L 12/28* | (2006.01) |
| *H04W 4/70* | (2018.01) |
| *H04L 29/08* | (2006.01) |
| *H04W 8/00* | (2009.01) |
| *H04W 8/26* | (2009.01) |

(52) U.S. Cl.
CPC .......... *H04L 12/2836* (2013.01); *H04L 67/16* (2013.01); *H04L 67/34* (2013.01); *H04W 4/70* (2018.02); *H04W 8/005* (2013.01); *H04W 8/12* (2013.01); *H04W 8/26* (2013.01)

(58) Field of Classification Search
USPC ...................................................... 455/432.2
See application file for complete search history.

(56) References Cited

U.S. PATENT DOCUMENTS

| | | | |
|---|---|---|---|
| RE31,247 E | 5/1983 | Johnstone | |
| 6,507,790 B1 | 1/2003 | Radomski | |
| 6,906,617 B1 | 6/2005 | Van der Meulen | |
| 7,155,553 B2 | 12/2006 | Lueck et al. | |
| 7,412,051 B1 | 8/2008 | Beathard et al. | |
| 7,660,406 B2 | 2/2010 | Fama et al. | |
| 7,971,139 B2 | 6/2011 | Stanciu et al. | |
| 8,032,780 B2 | 10/2011 | Koh et al. | |
| 8,112,506 B2* | 2/2012 | Son | H04L 12/2803 709/220 |
| 8,180,379 B2* | 5/2012 | Forstall | G01C 21/12 455/41.2 |
| 8,447,541 B2 | 5/2013 | Rada et al. | |
| 8,797,464 B2* | 8/2014 | Kim | H04L 12/2803 348/552 |
| 8,813,195 B2 | 8/2014 | Wen et al. | |
| 8,984,944 B2 | 3/2015 | Bernard | |
| 9,020,769 B2 | 4/2015 | Rada et al. | |
| 9,310,405 B2 | 4/2016 | Lai et al. | |
| 9,326,126 B2* | 4/2016 | Yang | H04W 4/70 |
| 2003/0065824 A1 | 4/2003 | Kudo | |
| 2004/0170262 A1* | 9/2004 | Ohno | H04L 12/2803 379/167.12 |
| 2005/0152380 A1 | 7/2005 | Lee et al. | |
| 2007/0130280 A1* | 6/2007 | Park | H04L 12/10 709/208 |
| 2007/0214262 A1* | 9/2007 | Buchbinder | H04L 12/2803 709/224 |
| 2008/0019392 A1 | 1/2008 | Lee | |
| 2008/0271123 A1* | 10/2008 | Ollis | G08C 17/02 726/4 |
| 2010/0042720 A1 | 2/2010 | Stienhans et al. | |
| 2010/0191487 A1 | 7/2010 | Rada et al. | |
| 2010/0210317 A1 | 8/2010 | Kakehi | |
| 2011/0106279 A1* | 5/2011 | Cho | G08C 17/02 700/90 |
| 2011/0125432 A1 | 5/2011 | Pomerantz et al. | |
| 2011/0251807 A1 | 10/2011 | Rada et al. | |
| 2011/0287748 A1* | 11/2011 | Angel | H04M 3/42221 455/414.1 |
| 2012/0065797 A1* | 3/2012 | Brian | H02J 3/14 700/295 |
| 2012/0179547 A1* | 7/2012 | Besore | G06Q 30/0261 705/14.58 |
| 2012/0209916 A1* | 8/2012 | Azuma | H04L 12/2814 709/204 |
| 2012/0221673 A1 | 8/2012 | Lee et al. | |
| 2013/0060358 A1* | 3/2013 | Li | G05B 15/02 700/90 |
| 2013/0091950 A1 | 4/2013 | Bernard | |
| 2013/0147954 A1 | 6/2013 | Song et al. | |
| 2013/0179593 A1* | 7/2013 | Dunlap | H04L 45/42 709/244 |
| 2013/0204408 A1 | 8/2013 | Thiruvengada et al. | |
| 2013/0239205 A1* | 9/2013 | Jacobs | G06F 21/36 726/19 |
| 2013/0289752 A1* | 10/2013 | Orsat | G08C 17/02 700/90 |
| 2014/0052783 A1 | 2/2014 | Swatsky et al. | |
| 2014/0172328 A1 | 6/2014 | Lai et al. | |
| 2014/0215043 A1 | 7/2014 | Ryu et al. | |
| 2014/0267907 A1* | 9/2014 | Downes | G06T 1/0071 348/525 |
| 2014/0304385 A1* | 10/2014 | Lee | H04L 12/2805 709/223 |
| 2014/0359675 A1* | 12/2014 | Mank | H04L 12/2805 725/80 |
| 2015/0032805 A1* | 1/2015 | Huang | H04L 67/2847 709/203 |
| 2015/0055640 A1 | 2/2015 | Wang et al. | |
| 2017/0202039 A1* | 7/2017 | Logue | H04W 76/021 |

FOREIGN PATENT DOCUMENTS

| | | |
|---|---|---|
| KR | 10-1997-0057199 A | 7/1997 |
| KR | 10-2005-0049773 A | 5/2005 |
| KR | 10-2005-0062896 A | 6/2005 |
| KR | 10-0497914 B1 | 6/2005 |
| KR | 10-2005-0073015 A | 7/2005 |
| KR | 10-2006-0008679 A | 1/2006 |
| KR | 10-2007-0058977 A | 6/2007 |
| KR | 10-0772412 B1 | 11/2007 |
| KR | 10-2008-0051040 A | 6/2008 |
| KR | 10-2008-0096239 A | 10/2008 |
| KR | 10-2009-0030393 A | 3/2009 |
| KR | 10-2009-0118424 A | 11/2009 |
| KR | 10-2010-0084782 A | 7/2010 |
| KR | 10-2011-0009338 A | 1/2011 |
| KR | 10-2011-0047764 A | 5/2011 |
| KR | 10-2011-0059479 A | 6/2011 |
| KR | 10-2011-0066000 A | 6/2011 |
| KR | 10-2011-0066001 A | 6/2011 |
| KR | 10-1052074 B1 | 7/2011 |
| KR | 10-2012-0058169 A | 6/2012 |
| KR | 10-2012-0098215 A | 9/2012 |
| KR | 10-2012-0139777 A | 12/2012 |
| KR | 10-2013-0066829 A | 6/2013 |

\* cited by examiner

TRANSFERRING OPERATING ENVIRONMENT OF REGISTERED NETWORK TO UNREGISTERED NETWORK

CROSS REFERENCE TO PRIOR APPLICATIONS

The present application is continuation application of U.S. patent application Ser. No. 15/136,964 (filed on Apr. 24, 2016), which is continuation application of U.S. patent application Ser. No. 14/484,594 (filed on Sep. 12, 2014), now issued as U.S. Pat. No. 9,326,126, which claims priority under 35 U.S.C. § 119 to Korean Patent Application No. 10-2013-0109839 (filed on Sep. 12, 2013).

The subject matter of this application is related to U.S. patent application Ser. No. 14/191,756 filed Feb. 27, 2014, U.S. patent application Ser. No. 14/172,118 filed Feb. 4, 2014, and U.S. patent application Ser. No. 14/514,499 filed Oct. 15, 2014, the teachings of which are incorporated herein their entirety by reference.

BACKGROUND

The present disclosure relates to a home network service and, more particularly, to providing the same operating environment of a registered home network to a user in an unregistered home network.

A home network has been introduced. The home network couples a plurality of electronic devices (e.g., computer, television, refrigerator, and audio system) and controls them in response to a user input. Particularly, when a user is in a service area of a registered home network, the home network may enable a user to control smart devices in the registered home network with minimum interaction to the smart devices. Through such home network, the user might perform repeated daily tasks conveniently. However, such a home network service cannot be provided to the user when the user visits a unregistered home network although the unregistered home network includes smart devices similar to those in the registered home network.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a user may be enabled to transfer operation environment of a registered home network to an unregistered home network when the user visits the unregistered home network.

In accordance with another aspect of the present embodiment, a user may be enabled to control smart devices in an unregistered home network when the user visits the unregistered home network.

In accordance with at least one embodiment, a method may be provided for providing an operation environment of a registered network having first devices to a user in an unregistered network having second devices. The method may include detecting the second devices in the unregistered network when user equipment associated with the user enters a service area of the unregistered network, selecting devices compatible with the first devices in the registered network from the detected second devices as compatible devices, obtaining system images of the first devices compatible with the selected compatible devices, and installing the obtained system images of the first devices at the selected compatible devices, respectively.

The detecting may include receiving second device information on the second devices in the registered network and extracting a list of the second devices, user identification information associated with the user equipment, network identification information associated with the registered network.

The selecting devices may include identifying the registered network based on user identification information associated with the user equipment, obtaining first device information of the registered network based on the identified registered network, and selecting the compatible devices from the second devices based on the obtained first device information of the registered network and second device information received from the user equipment.

The obtaining system images may include transmitting an inquiry message to the user equipment for requesting the user to choose a type of providing the operation environment of the registered network, receiving a response message from the user equipment in response to the inquiry message, and performing a procedure of installing a system image when the response message indicates system image installation as the type of the providing the operation environment.

The installing the obtained system images of the first devices may include transmitting an installation instruction message with the obtained system images of the first devices to a gateway of the unregistered network. The gateway of the unregistered network identifies the compatible devices in the unregistered network based on identifiers of the compatible devices in the installation instruction message and transmits an installation message and a corresponding system image to a respective one of the identified compatible devices.

After the installing the obtained system images, the method may further include generating a user interface for enabling the user to control at least one of the compatible devices and transmitting the generated user interface the user equipment, wherein the user equipment provides the user interface, receives a user input to control the at least one of the compatible devices through the user interface, and controls the at least one of the compatible devices installed with the system image and in the unregistered device based on the received user input by generating a control signal based on the user input and transmitting the generated control signal to the at least one of the compatible devices.

After the installing the obtained system images, the method may further include receiving a restoration message from the user equipment and transmitting a deletion instruction message to a gateway of the unregistered network, wherein the gateway of the unregistered network identifies second devices installed with the system images of the first devices in the registered network based on information included in the deletion instruction message and controls the identified second devices to restore an original operation environment by deleting the installed system image.

Prior to the detecting the second devices, the method may further include receiving device information on devices in a corresponding network from a gateway of the corresponding network upon generation of a predetermined event, wherein the device information includes hardware information, operation information, and a system mage of each device in the corresponding network. The gateway may be configured to search for devices supporting an associated network service in the corresponding network, to collect the hardware information of the searched devices through communication with the searched devices, to obtain the operation information of the searched devices through communication with the searched devices, to generate system images of the searched devices based on the collected hardware information and the obtained operation information, to generate the device information of the searched devices by including the hardware information, the operation information, and the generated system images of the searched devices, and to transmit the generated device information with network identification information of the corresponding network to a service server.

In accordance with at least one embodiment, a method may be provided for providing, by a service server, an operation environment of a first home network having first smart devices to a user visiting a second home network having second smart devices. The method may include detecting the second smart devices in the second home network when user equipment associated with the user enters a service area of the second home network, selecting smart devices compatible with the first smart devices in the first home network from the detected second smart devices as compatible smart devices, generating a management interface for managing the selected compatible smart devices in the second home network, and transmitting the generated management interface to the user equipment.

In accordance with at least one embodiment, a method may be provided for providing, by a service server, an operation environment of a first home network having first smart devices to a user visiting a second home network having second smart devices. The method may include detecting the second smart devices in the second home network when user equipment associated with the user enters a service area of the second home network, selecting smart devices compatible with the first smart devices in the first home network from the detected second smart devices as compatible smart devices, and providing a virtual machine for managing the selected compatible smart devices in the second home network.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figure 1:
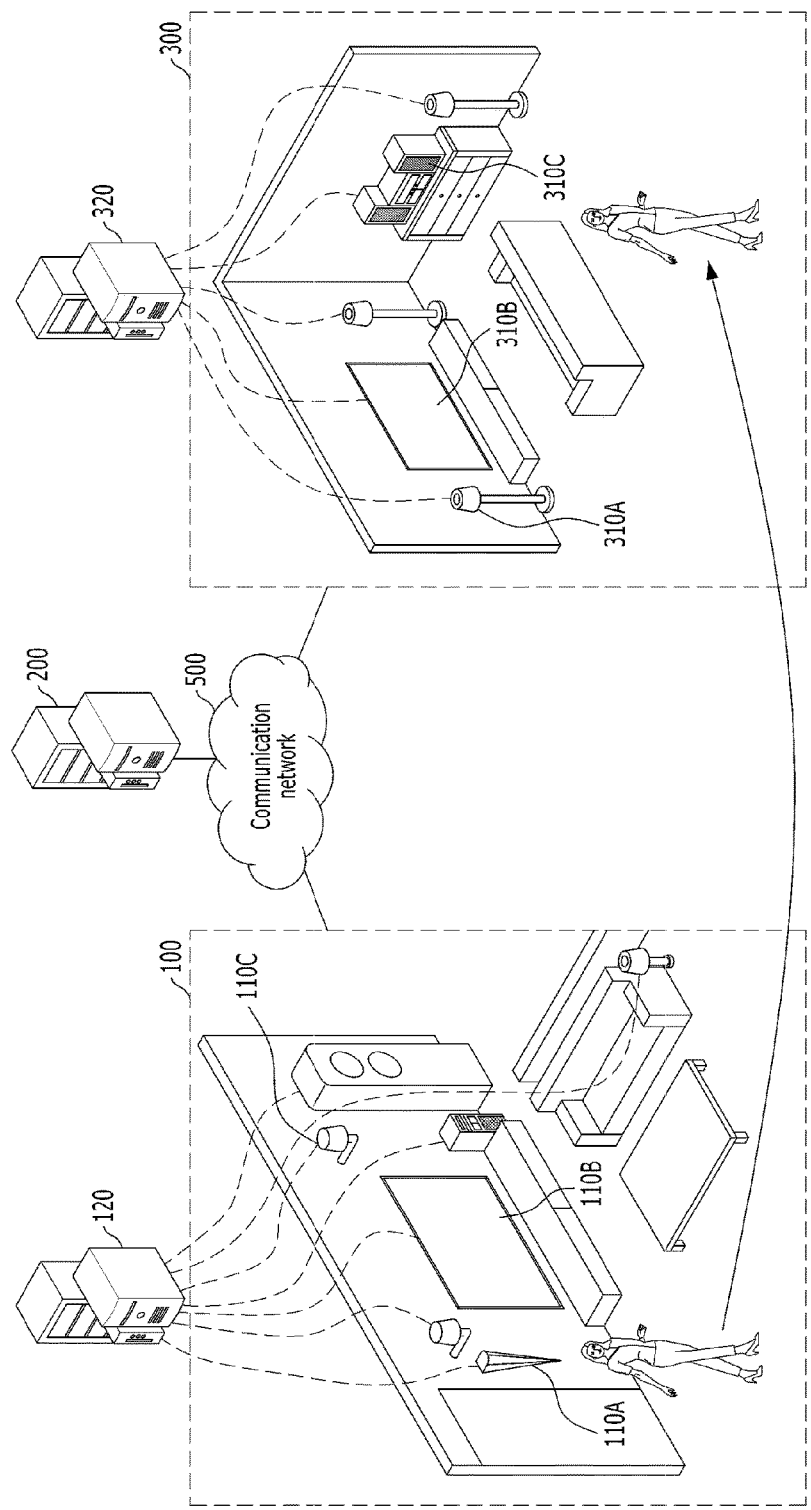
FIG. 1 illustrates a home network system in accordance with at least one embodiment.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, a user may be enabled to use and/or to control at least one device in an unregistered home network with the same operating environment of the registered home network when the user visits the unregistered home network. Such operation may be provided through a home network service in accordance with at least one embodiment. The home network service may be provided through at least one of system image installation, a managing interface, and a virtual machine. Hereinafter, overall operation of such a home network service will be described with reference to FIG. 1.

FIG. 1 illustrates a home network system in accordance with at least one embodiment. Referring to FIG. 1, a home network system may include first home network 100, second home network 300, service server 200, and user equipment 400. A home network may be referred to as a home area network. Such a home network may be a type of a local area network that develops from the need to facilitate communication and interoperability among digital devices present inside or within the close vicinity of a home. Devices capable of participating in the home network may be referred to as a smart device. Such smart devices may increase the quality of life inside the home in a variety of ways, such as automation of repetitious tasks, increased personal productivity, enhanced home security, and easier access to entertainment.

For example, first and second home networks 100 and 300 may communicate with service server 200 through communication network 500. Communication network 500 may be a mobile communication network or a wide area wired communication network, but the present invention is not limited thereto.

Each one of first and second home networks 100 and 300 may include a plurality of smart devices 110A to 110C and 310A to 310C and gateways 120 and 320. A smart device may be an electronic device connected to a corresponding gateway through a home network and a service server through a communication network and perform a designated operation in response to a predetermined event with minimum interaction with a user. For example, the smart device may include various home appliances having a circuit capable of communication with a gateway and a service server and perform the designated operation in response to a user input. The smart device may include a light, a refrigerator, a television set (TV), a computer, a network printer, a door entry system, an audio system, and so forth.

A gateway (e.g., gateways 120 and 320 in FIG. 1) may be coupled to smart devices in a corresponding home network. Such a gateway may i) control smart devices, ii) relay signals between smart devices and a communication network (e.g., communication network 500), iii) perform a firewall function, and iv) perform a user authentication function. For example, gateway 120 may receive a control signal from user equipment 400 and control associated smart devices 110A to 110C in first home network 100 based on the received control signal.

In accordance with at least one embodiment, gateway 120 searches for smart devices supporting a smart home service in first home network 100, obtain hardware information, such as a serial number, a model name, and a manufacturer, from the searched smart devices, and transmit the obtained device information to service server 200.

Gateway 120 and 320 may generate a system image of each smart device supporting the smart home service and transmit the generated system image of each smart device to service server 200. The system image may denote an exact copy of a driving software structure for controlling a corresponding smart device and for performing a designated operation through a corresponding smart device in response to a user input, upon detection of a predetermined condition, and/or upon generation of a predetermined event. The system image may include the operation information including information on an operating system, a license of the operating system, device and operation settings, programs, and files of a respective smart device.

Gateway 120 and 320 may receive a request for installing a system image from one of service server 200 and user equipment 400. In response to the request, gateway 120 and 320 may transmit the corresponding system image to a designated device and control the designated device to install the system image.

User equipment 400 may access one of gateways 120 and 320 of first and second home networks 100 and 300 and control smart devices in the corresponding home network. In particular, when user equipment 400 visits an unregistered home network, user equipment 400 searches for smart devices in the unregistered home network and transmits a list of the searched smart devices to service server 200. Then, user equipment 400 requests service server 200 to select controllable smart devices from the searched smart devices, which are compatible with smart devices in a registered home network associated with user equipment 400.

User equipment 400 may receive one of a management interface and a virtual machine from service server 200 to control the compatible smart devices in the unregistered home network. Upon the receipt of the management interface, user equipment 400 may display a graphic user interface that enables a user to control the compatible smart devices in the unregistered home network. That is, user equipment 400 may receive a management interface including at least one system image of a corresponding smart device in a registered home network from service server 200 and request service server 200 to selectively install the at least one system image in a compatible smart device in the unregistered home network.

Upon the receipt of the virtual machine, user equipment 400 may install the received virtual machine. Through the installed virtual machine, user equipment 400 may control at least one smart device in the unregistered home network. The virtual machine may be a software program enabling a user to control an operating environment of the unregistered home network when the user visits the unregistered home network. Such a virtual machine may include a user interface and a system image for controlling a compatible smart device in the unregistered home network. When user equipment 400 is installed with the virtual machine, at least one of an independent platform, an operating system, and an application is installed in user equipment 400 for controlling an operating environment of the unregistered home network.

User equipment 400 may include a notebook computer, a tablet computer, a WCDMA terminal, a LTE terminal, and a smart phone.

Service server 200 may be a computing system for supporting a home network service in accordance with at least one embodiment. In particular, when a user visits an unregistered home network (e.g., second home network 300), service server 200 determines whether any smart devices in the unregistered home network are operable by the user and sets an operating environment of the unregistered home network based on the determination result. Hereinafter, such service server 200 will be described in detail with reference to FIG. 2.

Figure 2:
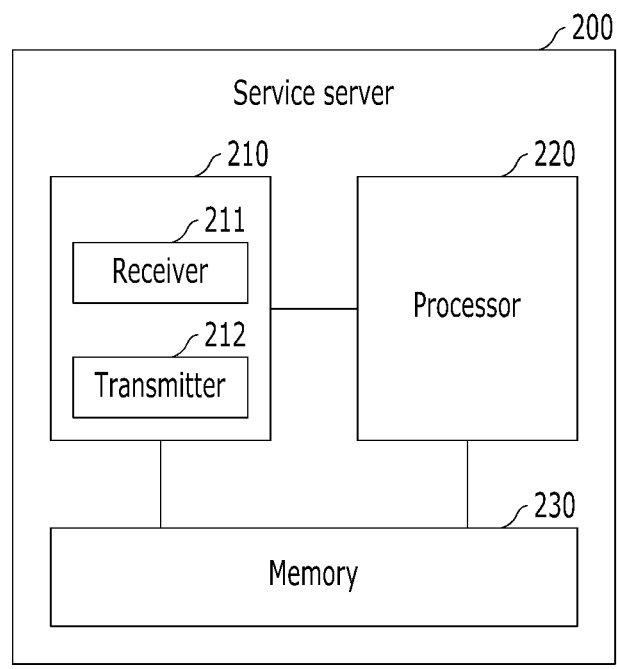
FIG. 2 illustrates a service server in accordance with at least one embodiment.

FIG. 2 illustrates a service server in accordance with at least one embodiment. Referring to FIG. 2, service server 200 may include communication circuit 210 including receiver 211 and transmitter 212, processor 220, and memory 230.

Communication circuit 210 may receive information, data, and/or signals from and transmit information, data, and/or signal to other entities including gateways 120 and 320, user equipment 400, and smart devices 110A to 110C and 310A to 310C.

Memory 230 may store various information, for example, an operating system for controlling constituent elements, a designated application for providing a home network service, and information necessary for providing a home network service. In accordance with at least one embodiment, memory 230 may store user identification information registered at each home network 100 and 300. That is, memory 230 may store at least one of user identification information mapped to each one of home network identification information. The user identification information may include at least one of home network service identification of a user and device identification information of associated user equipment 400. Memory 230 may also store hardware information and operation information of smart devices, mapped to corresponding home network identification information. Furthermore, memory 230 may store a system image of each smart device in a registered home network. Memory 230 may store a list of compatible smart devices in a predetermined home network. That is, memory 230 may store information on smart devices compatible with a smart device in a registered home network.

Processor 220 may control associated constituent elements and other entities coupled through communication network 500. Particularly, processor 220 may perform operations for providing an operating environment of a registered home network to a user in an unregistered home network so as to enable the user to use or to control smart devices in the unregistered home network with the same operation conditions in the registered home network in accordance with at least one embodiment.

For example, processor 220 may perform operations for obtaining hardware information, operation information, and a system image of each smart device from smart device information upon the receipt of the smart device information from a corresponding gateway (e.g., gateway 120 or 320). Such obtained information may be stored in memory 230.

Processor 220 may perform operations for finding controllable smart devices in a home network (e.g., registered home network or unregistered home network). In particular, processor 220 may perform operation for finding devices supporting (e.g., participating in) a home network service in an unregistered home network. Such finding procedure can be performed through communication with each smart device or based on information stored in memory 230.

Furthermore, based on a compatible device list stored in memory 230, compatible smart devices in the unregistered home network may be determined.

Processor 220 may perform an operation for determining a type of providing an operating environment of a registered home network. In particular, processor 220 may provide a user interface to user equipment 400 that enables a user to choose one of i) providing a virtual machine, ii) installing a system image, and iii) providing a management interface.

Processor 220 may perform an operation for transmitting a system image to a gateway of an unregistered home network or for providing a management interface to user equipment 400 for controlling installation of a system image when the user visits the unregistered home network. That is, when the system image installation is selected as the providing type, processor 220 may perform operations for extracting a system image of a smart device in a registered home network, which is corresponding to a compatible smart device in an unregister home network, transmitting the extracted system image to a gateway of the unregistered home network, and controlling the compatible smart device to install the extracted system image.

When the management interface is decided as the providing type, processor 220 may perform operations for generating a management interface for managing an operating environment of each compatible smart device in the unregistered home network and providing the generated management interface to user equipment 400.

When the virtual machine is decided as the providing type, processor 220 may perform operations for generating a virtual machine for controlling a compatible smart device in an unregistered home network and providing the generated virtual machine to user equipment 400. In particular, processor 220 may perform operations for extracting, from memory 230, a system image of a corresponding smart device in a registered home network, which is compatible to a target smart device to control in the unregistered home network, generating a virtual machine including the extracted system mage and a user interface for controlling the target smart device in the unregistered home network, and transmitting the generated virtual machine to user equipment 400.

Processor 220 may perform operations for restoring an original operating environment of smart devices in an unregistered home network, after installing a system image in the smart devices in the unregistered home network. That is, when a restoration message is received from user equipment 400, processor 220 may perform operations for transmitting a deletion message to a gateway of the unregistered home network. In response to the deletion message, an operating environment of a compatible smart device in the unregistered home network is restored to an original operating environment.

As described, service server 200 may provide an operation environment of a smart device in a registered home network to a user in an unregistered home network in accordance with at least one embodiment. Such operation will be described in detail with reference to FIG. 3 to FIG. 6.

Figure 3:
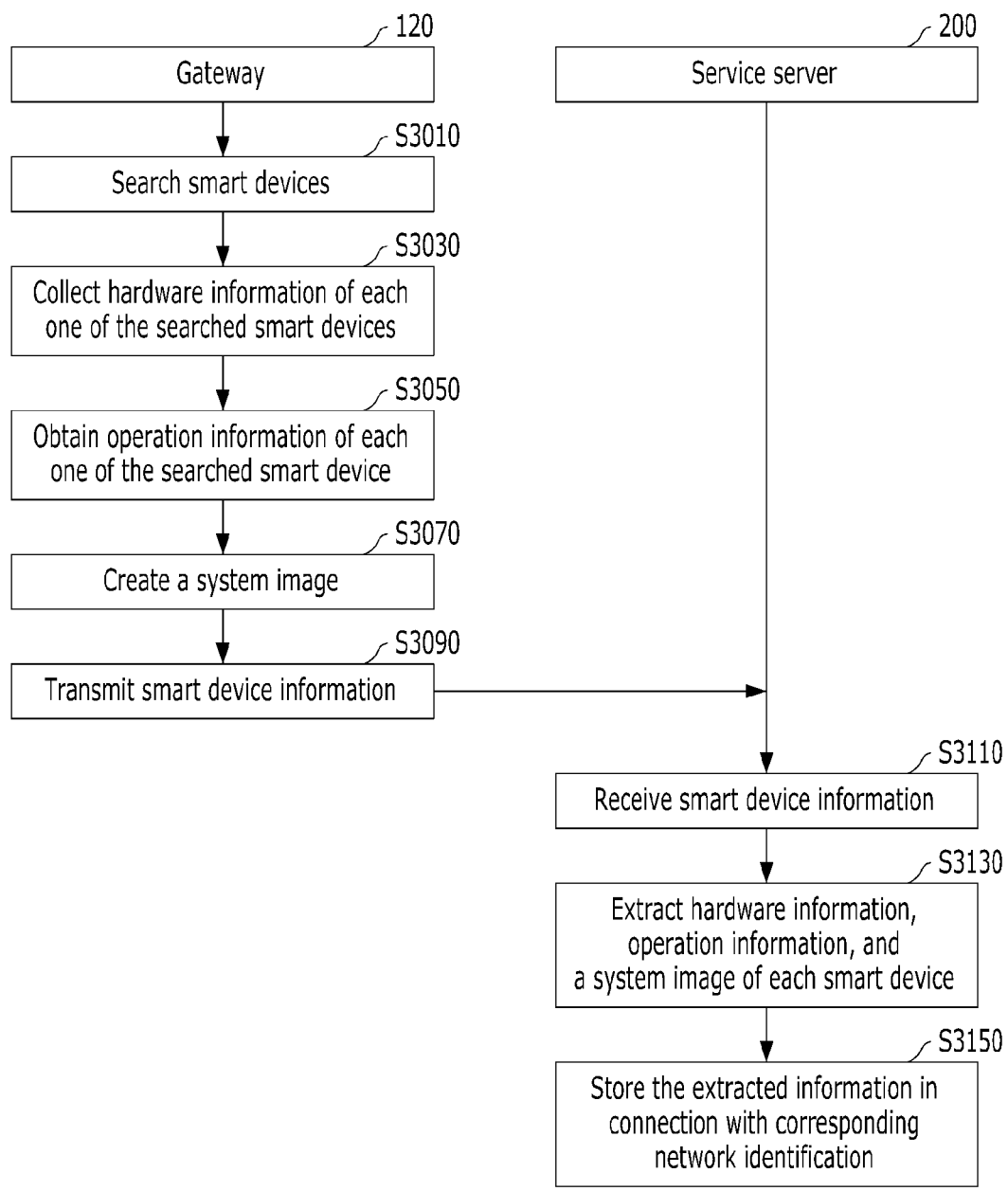
FIG. 3 illustrates a method for finding devices supporting a home network service and included in a home network in accordance with at least one embodiment.

FIG. 3 illustrates a method for finding devices supporting a home network service and included in a home network in accordance with at least one embodiment.

Referring to FIG. 3, devices supporting a home network service may be searched at step S3010. A device interacting with a service server and a gateway to perform a designated task (e.g., supporting a home network service) is referred to as a smart device. A gateway of a home network may search for such smart devices distributed in a corresponding home network at a regular interval or upon generation of a predetermined event. The predetermined event may include receiving a request message from service server 200 and/or user equipment 400.

In case of first home network 100 in FIG. 1, gateway 120 searches smart devices 110A, 110B, and 110C distributed in home network 100 at a predetermined interval. For convenience and ease of understanding, first home network 100 will be described as an exemplary home network, but the present invention is not limited thereto. Operations described with reference to FIG. 3 are performed similar in second home network 300.

At step S3030, hardware information on the searched smart devices may be collected. For example, first gateway 120 communicates with the searched smart devices, such as door entry system 110A, TV 110B, and light 110C, and obtains hardware information of each one of the searched smart devices. The hardware information may include a serial number, a model name, a manufacturer, and so forth.

At step S3050, operation information of each searched smart device may be obtained. For example, first gateway 120 obtains, as operation information, information on an operating system, a license thereof, device and operation settings, programs, and files of each one of the searched smart devices through communication with respective smart devices.

The device and operation settings information may include information on parameters of controlling constituent elements and parameters of performing predetermined operations in response to a user input, upon detection of a predetermined condition, and/or upon generation of a predetermined event. Such the device and operation settings may be set by a user to control a predetermined smart device and to perform a designated operation through a predetermined smart device. For example, the device and operation settings may include information on values set by an associated user, such as a temperature value, a TV volume value, and a light brightness value. The programs and the files may denote programs and files necessary to control a smart device and/or to perform a designated operation through a respective smart device. Furthermore, device and operation setting information may include service subscription information of an associated user, such as cable TV subscription information and video on demand (VOD) service subscription information.

At step S3070, a system image may be generated based on the obtained information. For example, first gateway 120 obtains hardware information and operation information of each one of the searched smart devices in first home network 100 as described. Based on the obtained information, first gateway 120 may generate a system image of each one of the searched smart devices. The system image may denote an exact copy of a driving software structure for controlling a corresponding smart device and for performing a designated operation through a corresponding smart device in response to a user input, upon detection of a predetermined condition, and/or upon generation of a predetermined event. The system image may include the operation information including information on an operating system, a license of the operating system, device and operation settings, programs, and files of a respective smart device. Accordingly, a user may be enabled to user and/or to control a device in a unregistered home network with the same customized settings of the user if the device in the unregistered home network is installed with a system image generated based on hardware information and operation information of a similar device (e.g., compatible device) in a registered home network.

That is, first gateway 120 generates a system image of each one of the searched smart devices in first home network 100, such as door entry system 110A, TV 110B, and light 110C, to include the obtained information, such as an operating system, a license thereof, device and operation settings, programs, and files.

The system image of each smart device was described as being created by first gateway 120, but the present invention is not limited thereto. For example, such a system image of a smart device may be generated by service server 200 after collecting hardware information and operation information of the smart device.

At step S3090, smart device information may be transmitted to a service server. For example, as the smart device information of first home network 100, first gateway 120 transmits the hardware information, the operation information, and the created system image of each one of the searched smart device to service server 200. Furthermore, first gateway 120 also transmits network identification information of first home network 100 to service server 200.

At step S3110, smart device information may be received. For example, receiver 211 of service server 200 receives the smart device information of first home network 100 from first gateway 120 with the network identification information of first home network 100. As described, the smart device information of first home network 100 includes hardware information, operation information, and a system image of each one of smart devices in first home network 100.

At step S3130, hardware information, operation information, and a system image of each smart device may be extracted from the received smart device information. For example, processor 220 of service server 200 extracts the hardware information, the operation information, and the system image of each smart device in first home network 100 from the received smart device information of first home network 100. Furthermore, processor 220 extracts the network identification information from the smart device information.

At step S31350, the extracted information may be stored in connection with corresponding network identification information. For example, processor 220 maps the extracted network identification with the extracted information (e.g., hardware information, operation information, and a system image) of each smart device in first home network 100. Then, processor 220 stores the extracted information (e.g., hardware information, operation information, and a system image) of each smart device in memory 230 with the mapping relation with the network identification of first home network 100.

As described, first gateway 120 of first home network 100 obtains information of each smart device in corresponding first home network 100 and provides the smart device information to service server 200. Second gateway 320 of second home network 300 performs the same operation for providing smart device information of second home network 300 to service server 200. Accordingly, service server 200 may store smart device information of home networks managed under the control of service server 200.

For example, when a user registers first home network 100 as a registered home network for a home network service, first gateway 120 performs operations in FIG. 3 to collect smart device information of first home network 100 and to provide the collected smart device information to service server 200. When this user visits an unregistered home network (e.g., second home network 300), service server 200 may enable the user to use and/or to control compatible smart devices in second home network 300 with the same operation conditions of first home network 100 by providing an operating environment of a registered home network to the user in an unregistered home network. Particularly, an operating environment of the registered home network may be provided through one of a system image, a management interface, and a virtual machine in accordance with at least one embodiment. Such operation will be described in detail with reference to FIG. 4A, FIG. 4B, FIG. 5A, FIG. 5B, FIG. 6A, and FIG. 6B. For convenience and ease of understanding, a user is assumed to register first home network 100 as a registered home network and to visit second home network 300 for describing the operation in FIG. 4A, FIG. 4B, FIG. 5A, FIG. 5B, FIG. 6A, and FIG. 6B, but the present invention is not limited thereto.

Figure 4A:
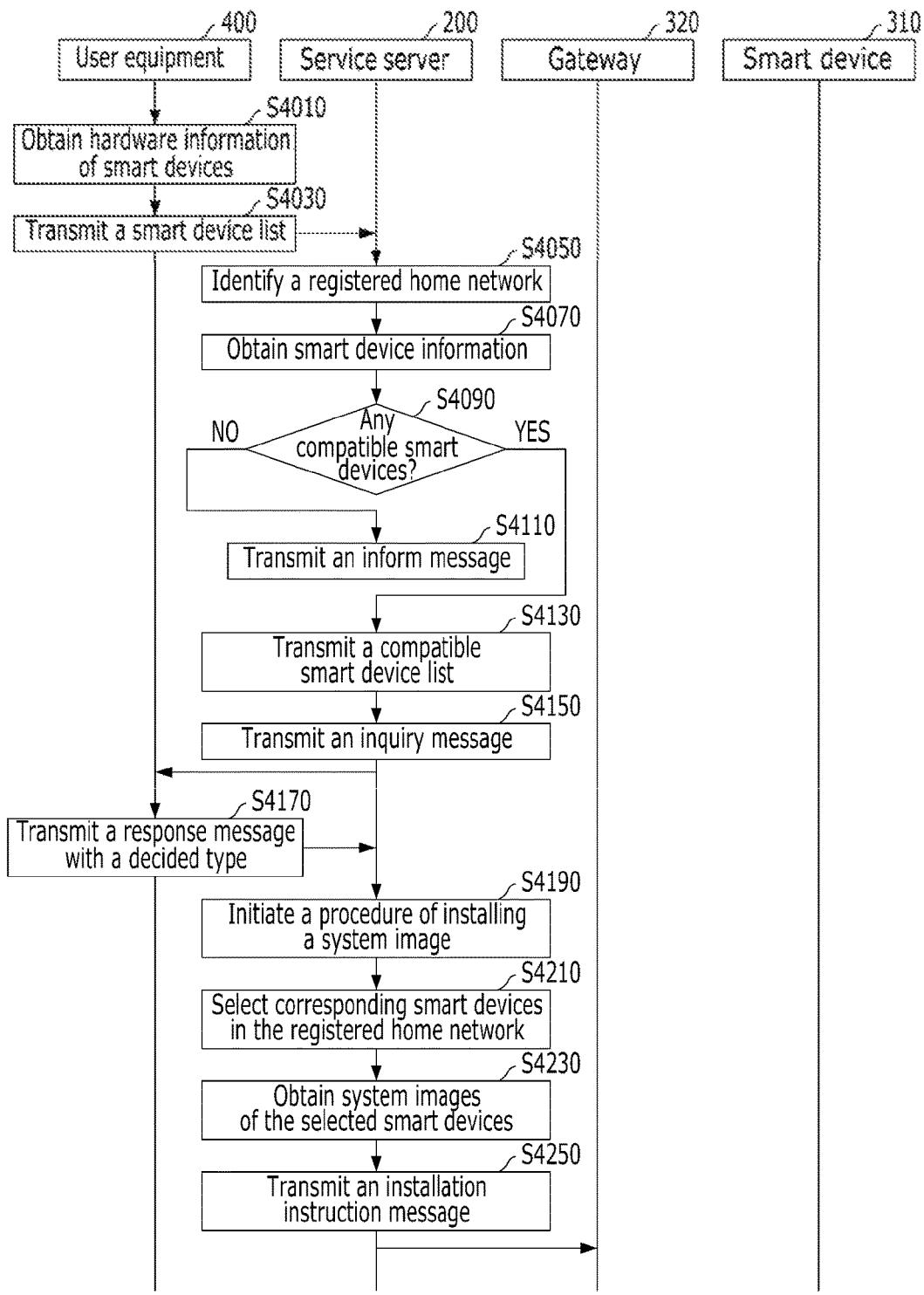
FIG. 4A and FIG. 4B illustrate providing an operating environment of a registered home network to a user in an unregistered home network through installation of a system image in accordance with at least one embodiment.
Figure 4B:
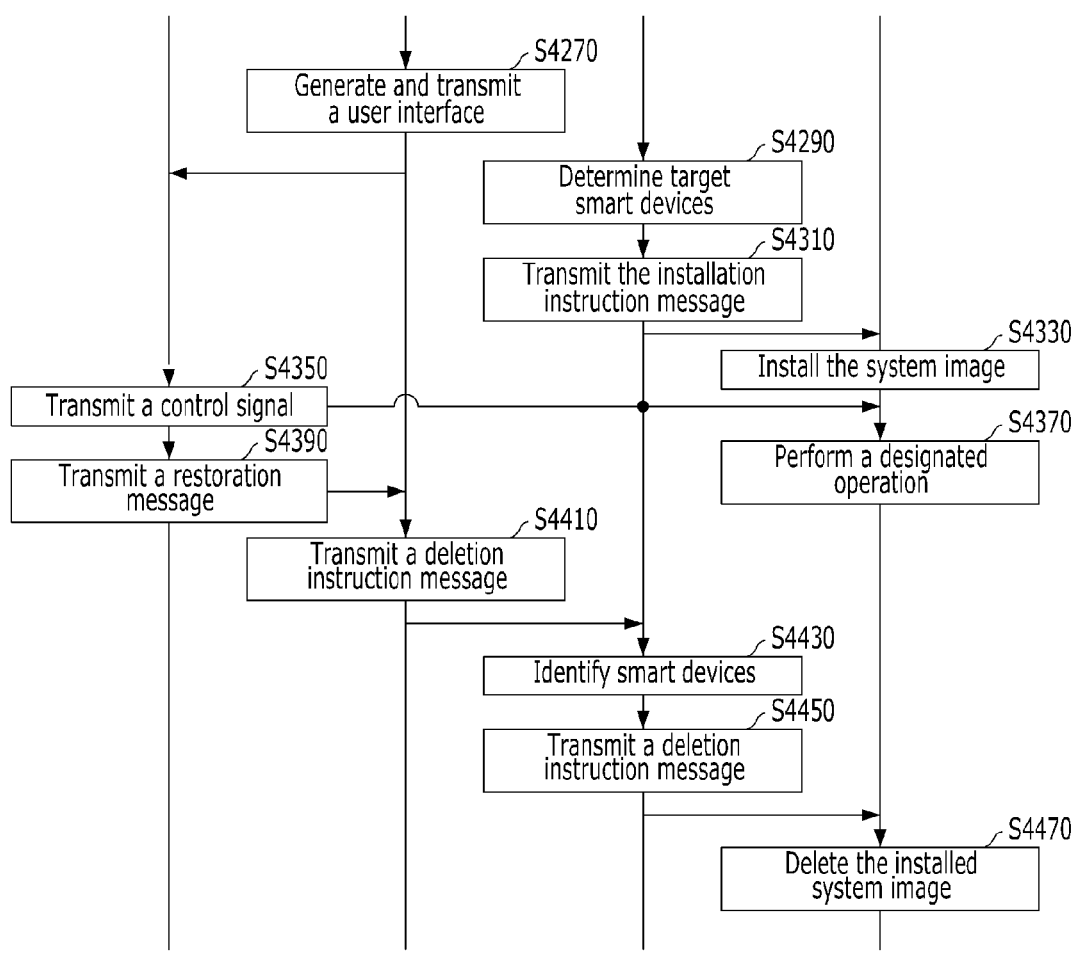

FIG. 4A and FIG. 4B illustrate providing an operating environment of a registered home network to a user in an unregistered home network through installation of a system image in accordance with at least one embodiment.

Referring to FIG. 4A and FIG. 4B, hardware information of smart devices in an unregistered home network may be obtained at step S4010. For example, when a user registered at first home network 100 visits an unregistered home network (e.g., second home network 300), associated user equipment 400 obtains hardware information of smart devices in second home network 300. The hardware information may include a serial number, a model name, a manufacturer, and so forth.

In particular, user equipment 400 searches for smart devices in second home network 300. As shown in FIG. 1, second home network 300 includes three smart devices, light 310A, TV 310B, and audio system 310C. Accordingly, user equipment 400 finds three smart devices, light 310A, TV 310B, and audio system 310C in second home networker 300, as a searching result. User equipment 400 obtains hardware information of smart devices 310A to 310C through a short distance radio communication with smart devices 310A to 310C. Alternatively, user equipment 400 may request second gateway 320 to provide hardware information of smart devices 310A to 310C in second home network 300. In response to the request, user equipment 400 may receive the requested hardware information of smart devices 310A to 310C in second home network 300 from second gateway 320.

At step S4030, a smart device list of the unregistered home network may be transmitted. For example, user equipment 400 transmits a list of smart devices 310A to 310C in the unregistered home network (e.g., second home network 300) to service server 200. Furthermore, user equipment 400 also transmits user identification information (e.g., user equipment 400 or an associated user) and network identification information of the unregistered home network (e.g., second home network 30) to service server 200. For example, the user identification information may include at least one of a home network service identifier (ID), an international mobile subscriber identity (IMSI), and a mobile communication telephone number.

At step S4050, a registered home network may be identified. For example, receiver 211 of service server 200 receives user identification information from user equipment 400 and processor 220 of service server 200 identifies a registered home network (e.g., first home network 100) based on the received user identification information. That is, service server 200 determines that a registered home network associated with user equipment 400 is first home network 100 by comparing the received user identification information with information stored in memory 230.

At step S4070, smart device information of the registered home network may be obtained. For example, processor 220 of service server 200 obtains smart device information of the registered home network (e.g., first home network 100) from database in memory 230. Such smart device information may be collected and stored regularly, as described with reference to FIG. 3.

At step S4090, determination may be made so as whether any compatible smart devices in the unregistered home network. For example, processor 220 of service server 200 determines whether any smart devices in the unregistered home network are compatible with smart devices in the registered home network (e.g., between first and second home networks 100 and 300). The compatible smart device in an unregistered home network may denote a smart device in the unregistered home network, which is similar to or identical to that in a registered home network so as to be controlled with an operating environment (e.g., system image) of a corresponding smart device in the registered home network. The compatible smart device may be referred to as a controllable smart device.

In order to determine, service server 200 may compare hardware information of smart devices in the unregistered home network (e.g., second home network 300) with hardware information of smart devices in the registered home network (e.g., first home network). Alternatively, processor 220 of service server 200 may obtain a compatible device list of the unregistered home network, which is previously created and stored in memory 230.

In particular, processor 220 of service server 200 may classify smart devices by a type and compares smart devices in the same type. For example, processor 220 of service server 200 may determine whether TV 110B in first home network 100 is compatible with TV 310B in second home network 300. Furthermore, processor 220 of service server 200 may determine whether light 110C in first home network 100 is compatible with light 310A in second home network 300.

In order to obtain smart device information of smart devices in second home network 300, service server 200 may receive network identification information of second home network 300 from user equipment 400 and fetch hardware information of smart devices mapped with the network identification information stored in memory 230.

In this case, user equipment 400 obtains second home network identification information from second home network 300 and transmit the obtained second home network identification information to service server 200. Service server 200 fetches hardware information of the smart devices in the second home network based on the second home network identification information. Service server 200 fetches hardware information of smart devices in first home network 100 based on the user identification information. Then, service server 200 detects comparable smart devices in second home network 300 based on the fetched hardware information and the comparable device list in memory 230.

When no smart device is compatible (No—S4090), an inform message may be transmitted at step S4110. For example, service server 200 may transmit, to user equipment 400, the inform message for noticing an associated user that there is no device is controllable in the unregistered home network. Accordingly, the associated user is aware of no device controllable in the unregistered home network (e.g., second home network 300) and manually controls devices in the visiting home network.

When at least one compatible smart device is found in the unregistered home network (Yes—S4090), a compatible smart device list may be generated and transmitted at step S4130. For example, processor 220 of service server 200 generates a compatible smart device list including information on controllable smart devices in the unregistered home network and transmits the generated compatible smart device list to the user equipment 400. Based on such a compatible smart device list, an associated user can be aware of controllable smart devices in the unregistered home network.

At step S4150, an inquiry message may be transmitted for determining a type of providing a registered operation environment to an unregistered home network. For example, processor 220 of service server 200 transmits an inquiry message to user equipment 400 for inquiring an associated user of a type of providing an operation environment of the registered home network (e.g., first home network 100) to the unregistered home network (e.g., second home network 300). In particular, processor 220 of service server 200 may transmit signals of a graphic user interface for enabling an associated user to choose one of a system image, a management interface, and a virtual machine.

At step S4170, a response message with a decided type of providing a registered operation environment may be transmitted. For example, user equipment 400 receives the inquiry message from service server 200 and displays the message (e.g., a graphic user interface) through a display thereof to an associated user. User equipment may receive a user input with the installation of a system image as a decided type of providing the operation environment. User equipment 400 generates the response message with a request of the installation of the system image and transmits the generated response message to service server 200.

At step S4190, a procedure of installing a system image may be initiated in response to the response message. For example, service server 200 receives the response message from user equipment 400 and initiates the procedure of installing a system image based on information included in the response message.

At step S4210, smart devices in the registered home network corresponding to the compatible smart devices in the unregistered home network may be selected. For example, processor 220 of service server 200 determines smart devices in the registered home network corresponding to the compatible smart devices in the registered home network based on the determination result of step S4090 and the smart device information of the registered home network.

At step S4230, system images of the selected smart devices may be obtained. For example, processor 220 of service server 200 obtains system images of the selected smart devices from the smart device information of the registered home network (e.g., first home network 100) stored in memory 230.

At step S4250, an installation instruction message may be transmitted with the obtained system image. For example, processor 220 of service server 200 transmits an installation instruction message to second gateway 320 with the compatible smart device list and the obtained system images. That is, the installation instruction message may include information on identifiers of the compatible smart devices in the unregistered home network and the obtained system images thereof.

The installation instruction message was described as being transmitted to a gateway of the unregistered home network, but the present invention is not limited thereto. For example, such installation message may be transmitted to each one of the compatible smart devices in the unregistered home network with the obtained system image. Furthermore, the gateway (e.g., second gateway 320) of the unregistered home network may be an object to install a system image of a gateway (e.g., first gateway 120) of the registered home network. In this case, service server 200 may transmit an installation instruction message to the gateway of the unregistered home network with the system image of first gateway 120. In response to the installation instruction message, the gateway of the unregistered home network installs the system image included in the installation instruction message. Then, service server 200 may transmit installation instruction messages with the obtained system images for the compatible smart devices in the unregistered home network.

At step S4270, a user interface may be generated and transmitted. For example, processor 220 of service server 200 may generate a user interface for enabling a user to control compatible devices in the unregistered home network (e.g., second home network 300) and transmit the generated user interface to user equipment 400.

At step S4290, target smart devices may be determined and system images thereof may be obtained from the installation instruction message. For example, second gateway 320 of the unregistered home network receives the installation instruction message from service server 200. Second gateway 320 analyzes the received installation instruction message, determines target smart devices to install a system image, and obtains corresponding system images from the received installation instruction message.

At step S4310, the installation instruction message with the obtained system image may be transmitted. For example, second gateway 320 transmits the installation instruction message with a corresponding system image to each one of the determined target smart devices in the unregistered home network.

At step S4330, the installation instruction message may be received and the system image may be installed. For example, the compatible smart devices receive the installation instruction message from second gateway 320 and install corresponding system images for performing a designated operation based on the user setups.

After the completion of the system image installation, the compatible smart devices in the unregistered home network have the same operating environment of the registered home network. Accordingly, the associated user is enabled to use and/or to control the compatible smart devices in the unregistered home network with the same operation conditions of the registered home network in accordance with at least one embodiment.

At step S4350, a control signal may be transmitted. For example, user equipment 400 transmits a control signal to a desired compatible smart device in the unregistered home network through second gateway 320.

At step S4370, a designated operation may be performed based on the control signal. For example, the desired compatible smart device may receive the control signal from user equipment 400 through second gateway 320 and performs a designated operation based on the control signal.

At step S4390, a restoration message may be transmitted upon generation of a predetermined event. For example, when user equipment 400 exits from a service area of the unregistered home network (e.g., second home network 300) or when user equipment 400 receives a message for interrupting to use compatible devices in the unregistered home network (e.g., second home network 300), user equipment 400 transmits a restoration message to service server 200.

At step S4410, a deletion instruction message may be transmitted. For example, service server 200 receives the restoration message from user equipment 400 and transmits a deletion instruction message to second gateway 200 in response to the restoration message. The deletion instruction message may include information on device identifiers of the compatible smart devices installed with corresponding system images.

At steps S4430, smart devices installed with the system images may be identified. For example, second gateway 320 receives the deletion instruction from service server 200 and identifies smart devices installed with the system images based on the device identifiers included in the deletion instruction message.

At step S4450, a deletion instruction message may be transmitted. For example, second gateway 320 transmits the deletion instruction message to the identified smart devices.

At step S4470, the installed system image may be deleted and an original operation environment may be restored. For example, the identified smart devices receive the deletion instruction message from second gateway 320. In response to the deletion instruction message, each one of the identified smart devices restores the original operation environment by deleting the installed system image.

An operation environment of a registered home network may be provided through a management interface in accordance with at least one embodiment. Such operation will be described with reference to FIG. 5A and FIG. 5B.

Figure 5A:
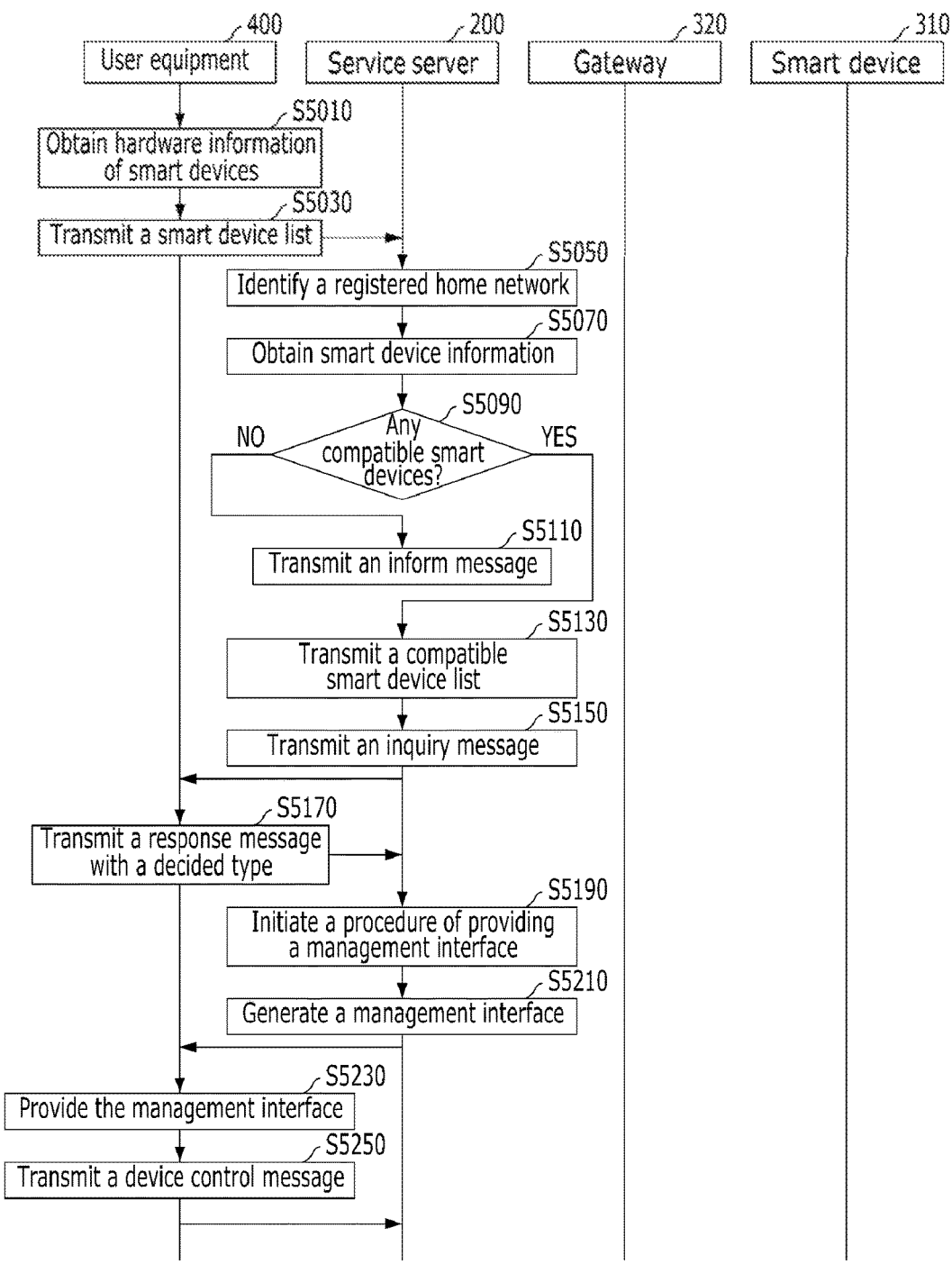
FIG. 5A and FIG. 5B illustrate providing an operating environment of a registered home network to a user in an unregistered home network through a management interface in accordance with at least one embodiment.
Figure 5B:
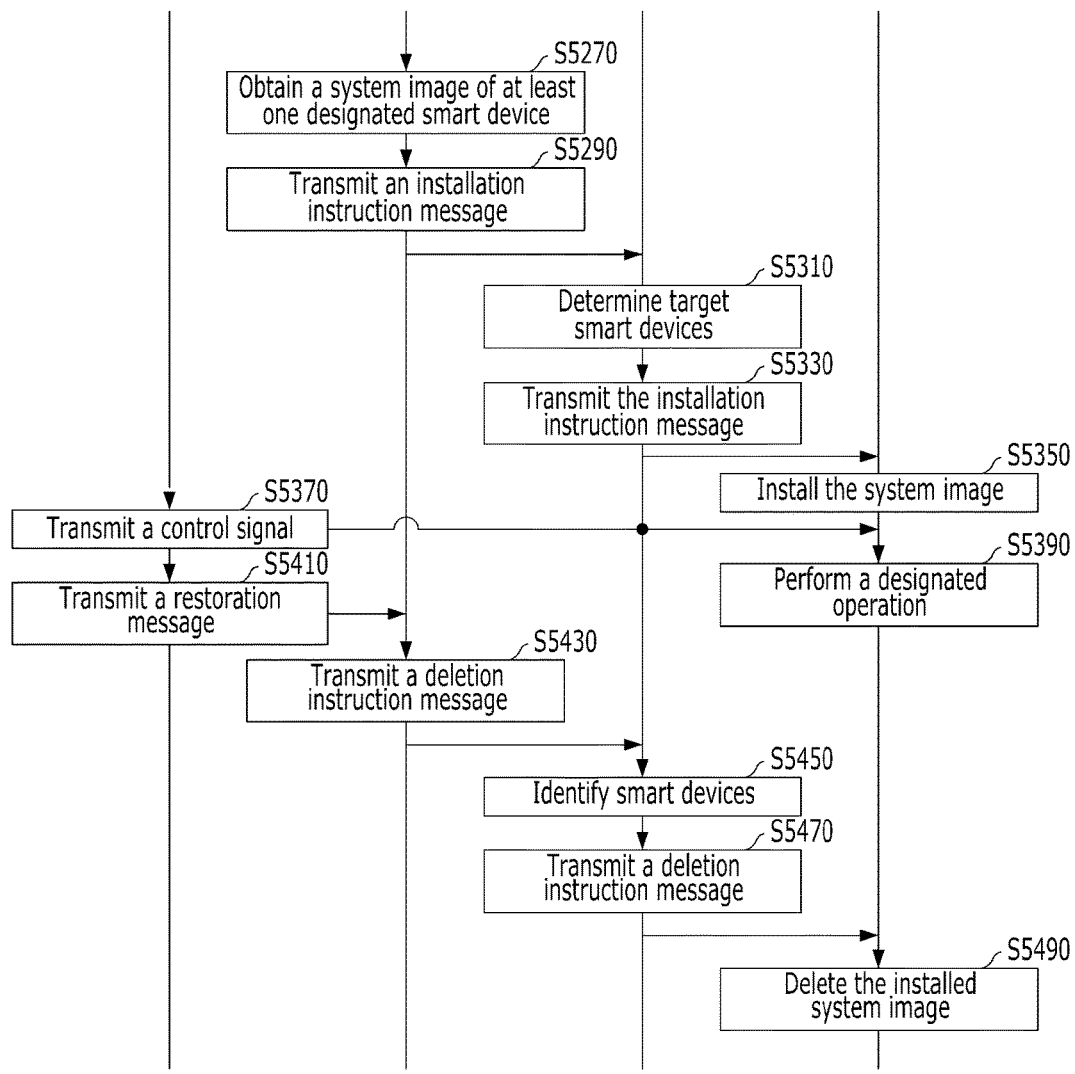

FIG. 5A and FIG. 5B illustrate providing an operating environment of a registered home network to a user in an unregistered home network through a management interface in accordance with at least one embodiment.

Referring to FIG. 5A and FIG. 5B, hardware information of smart devices in an unregistered home network may be obtained at step S5010. For example, when a user registered at first home network 100 visits an unregistered home network (e.g., second home network 300), associated user equipment 400 obtains hardware information of smart devices in second home network 300. The hardware information may include a serial number, a model name, a manufacturer, and so forth.

At step S5030, a smart device list of the unregistered home network may be transmitted. For example, user equipment 400 transmits a list of smart devices 310A to 310C in the unregistered home network (e.g., second home network 300) to service server 200. Furthermore, user equipment 400 also transmits user identification information (e.g., user equipment 400 or an associated user) and network identification information of the unregistered home network (e.g., second home network 30) to service server 200.

At step S5050, a registered home network may be identified. For example, receiver 211 of service server 200 receives user identification information from user equipment 400 and processor 220 of service server 200 identifies a registered home network (e.g., first home network 100) based on the received user identification information.

At step S5070, smart device information of the registered home network may be obtained. For example, processor 220 of service server 200 obtains smart device information of the registered home network (e.g., first home network 100) from database in memory 230.

At step S5090, determination may be made so as whether any compatible smart devices in the unregistered home network. For example, processor 220 of service server 200 determines whether any smart devices in the unregistered home network are compatible with smart devices in the registered home network (e.g., between first and second home networks 100 and 300). In order to determine, service server 200 may compare hardware information of smart devices in the unregistered home network (e.g., second home network 300) with hardware information of smart devices in the registered home network (e.g., first home network). Alternatively, processor 220 of service server 200 may obtain a compatible device list of the unregistered home network, which is previously created and stored in memory 230.

When no smart device is compatible (No—S5090), an inform message may be transmitted at step S5110. For example, service server 200 may transmit, to user equipment 400, the inform message for noticing an associated user that there is no device is controllable in the unregistered home network. Accordingly, the associated user is aware of no device controllable in the unregistered home network (e.g., second home network 300) and manually controls devices in the visiting home network.

When at least one compatible smart device is found in the unregistered home network (Yes—S5090), a compatible smart device list may be generated and transmitted at step S5130. For example, processor 220 of service server 200 generates a compatible smart device list including information on controllable smart devices in the unregistered home network and transmits the generated compatible smart device list to the user equipment 400. Based on such a compatible smart device list, an associated user can be aware of controllable smart devices in the unregistered home network.

At step S5150, an inquiry message may be transmitted for determining a type of providing a registered operation environment to an unregistered home network. For example, service server 200 transmits an inquiry message to user equipment 400 for inquiring an associated user of a type of providing an operation environment of the registered home network (e.g., first home network 100) to the unregistered home network (e.g., second home network 300). In particular, service server 200 may transmit signals of a graphic user interface for enabling an associated user to choose one of a system image, a management interface, and a virtual machine.

At step S5170, a response message with a decided type of providing a registered operation environment may be transmitted. For example, user equipment 400 receives the inquiry message from service server 200 and displays the message (e.g., a graphic user interface) through a display thereof to an associated user. User equipment may receive a user input with the management interface as a decided type of providing the operation environment. User equipment 400 generates the response message with a request of the management interface and transmits the generated response message to service server 200.

At step S5190, a procedure of providing a management interface may be initiated in response to the response message. For example, service server 200 receives the response message from user equipment 400 and initiates the procedure of providing a management interface based on information included in the response message.

At step S5210, in response to the request, a management interface may be generated. For example, processor 220 of service server 200 generates a management interface for controlling compatible smart devices in the unregistered home network (e.g., second home network 300) and managing an operating environment of unregistered home network 300. Service server 200 includes identifiers of the compatible smart devices in the unregistered home network and a set of commands for controlling the compatible smart devices in the management interface.

At step S5220, the generated management interface may be transmitted. For example, processor 220 of service server 200 transmits the generated management interface to user equipment 400.

At step S5230, the management interface may be provided to an associated user and an instruction may be received through the management interface. For example, user equipment 400 displays the management interface on a display of user equipment 400. Through management interface, user equipment 400 may receive requests of using at least one designated smart device among the compatible smart devices and commands to control a predetermined smart device from the associated user.

At step S5250, a device control message may be generated and transmitted. For example, upon the receipt of the requests and/or the commands thereof, user equipment 400 obtains identification information of at least one designated smart device and control parameters for controlling the at least one designated smart device based on the received commands, generates the device control message to include the obtained identification information and the control parameters, and transmit the device control message to service server 200.

At step S5270, a system image of at least one designated smart device may be obtained. For example, service server 200 receives the device control message from user equipment 400, extracts identification information of the at least one designated smart device from the device control message, and fetches a system image corresponding to the identification information from memory 230. That is, based on the identification information included in the device control message, service server 200 identifies a compatible smart device in the unregistered home network to install a system image and extracts a system image of a corresponding smart device in the registered home network (e.g., first home network 100) from memory 230.

At step S5290, an installation instruction message with the obtained system image may be transmitted. For example, service server 200 transmits the obtained system image and an installation instruction message to second gateway 320. That is, in accordance with at least one embodiment, service server 200 transmits an installation instruction message with a system image to a designated compatible smart device instead of transmitting system images to all of compatible smart devices in the unregistered home network.

At steps S5310, target smart devices may be determined and system images thereof may be obtained from the installation instruction message. For example, second gateway 320 of the unregistered home network receives the installation instruction message from service server 200. Second gateway 320 analyzes the received installation instruction message, determines target smart devices to install a system image, and obtains corresponding system images from the received installation instruction message.

At step S5330, the installation instruction message with the obtained system image may be transmitted. For example, second gateway 320 transmits the installation instruction message with a corresponding system image to each one of the determined target smart devices in the unregistered home network, which are designated by the user through the management interface.

At step S5350, the installation instruction message may be received and the system image may be installed. For example, the at least one designated compatible smart device receives the installation instruction message from second gateway 320 and install corresponding system images for performing a designated operation based on the user setups.

After installing the system image in the designated smart device in the unregistered home network, the designated compatible smart devices in the unregistered home network have the same operating environment of the registered home network. Accordingly, the associated user is enabled to use and/or to control the designated compatible smart devices in the unregistered home network with the same operation conditions of the registered home network in accordance with at least one embodiment.

At step S5370, a control signal may be transmitted. For example, user equipment 400 receives, through the management interface, commands (e.g., user inputs) for controlling the at least one of designated compatible smart devices in the unregistered home network, generates a control signal based on the received commands, transmits the generated control signal to one of the designated compatible smart devices through second gateway 320.

At step S5390, a designated operation may be performed based on the control signal. For example, one of the designated compatible smart devices may receive the control signal from user equipment 400 through second gateway 320 and performs a designated operation based on the control signal.

At step S5410, a restoration message may be transmitted upon generation of a predetermined event. For example, when user equipment 400 exits from a service area of the unregistered home network (e.g., second home network 300) or when user equipment 400 receives a message for interrupting to use the designated compatible devices in the unregistered home network (e.g., second home network 300), user equipment 400 transmits a restoration message to service server 200.

At step S5430, a deletion instruction message may be transmitted. For example, service server 200 receives the restoration message from user equipment 400 and transmits a deletion instruction message to second gateway 200 in response to the restoration message. The deletion instruction message may include information on device identifiers of the designated compatible smart devices installed with corresponding system images.

At steps S5450, smart devices installed with the system images may be identified. For example, second gateway 320 receives the deletion instruction from service server 200 and identifies designated smart devices installed with the system images based on the device identifiers included in the deletion instruction message.

At step S5470, a deletion instruction message may be transmitted. For example, second gateway 320 transmits the deletion instruction message to the identified smart devices.

At step S5490, the installed system image may be deleted and an original operation environment may be restored. For example, the identified smart devices receive the deletion instruction message from second gateway 320. In response to the deletion instruction message, each one of the identified smart devices restores the original operation environment by deleting the installed system image.

An operation environment of a registered home network may be provided through a virtual machine in accordance with at least one embodiment. Such operation will be described with reference to FIG. 6A and FIG. 6B.

Figure 6A:
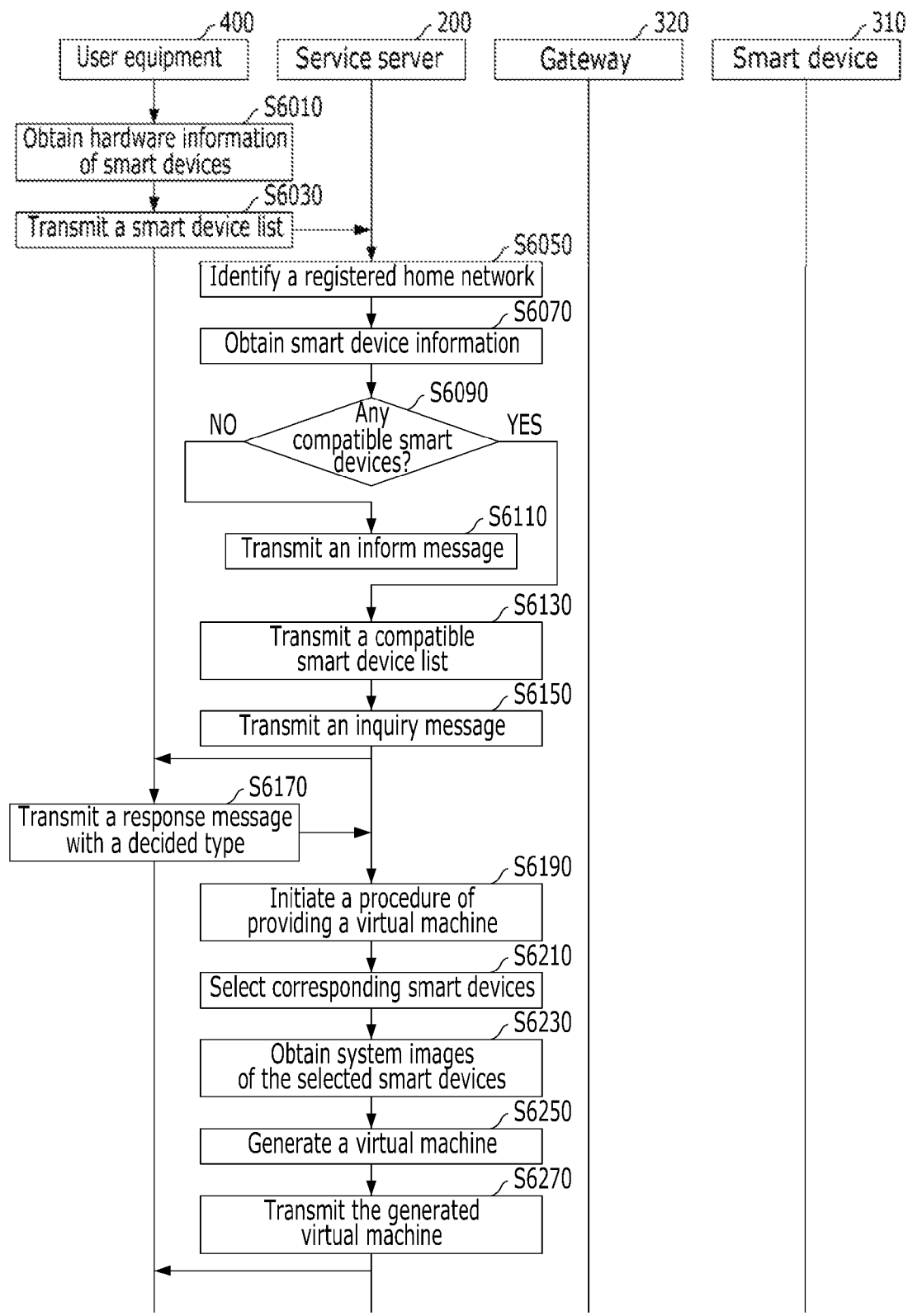
FIG. 6A and FIG. 6B illustrate providing an operating environment of a registered home network to a user in an unregistered home network through a virtual machine in accordance with at least one embodiment.
Figure 6B:
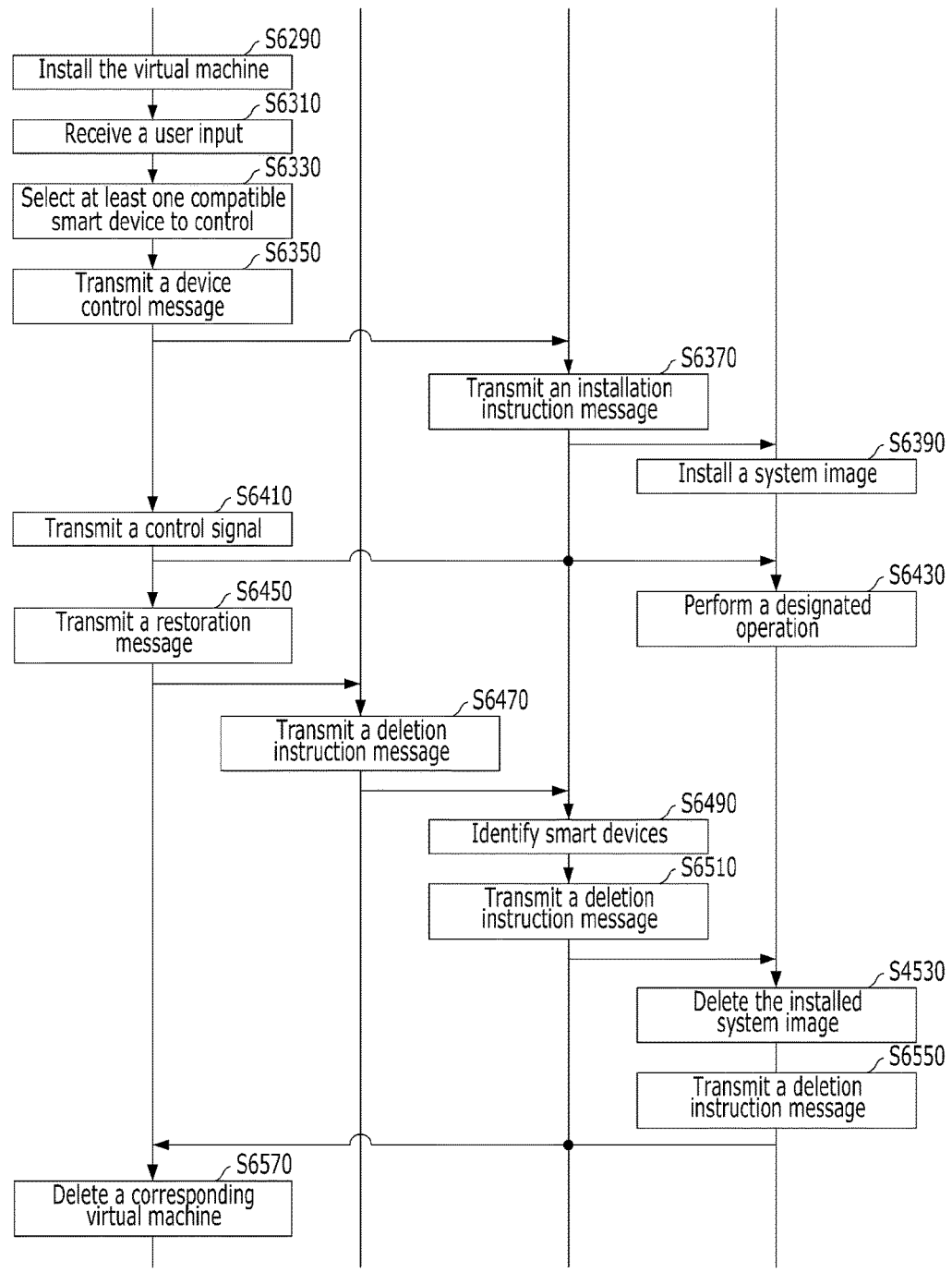

FIG. 6A and FIG. 6B illustrate providing an operating environment of a registered home network to a user in an unregistered home network through a virtual machine in accordance with at least one embodiment.

Referring to FIG. 6A and FIG. 6B, hardware information of smart devices in an unregistered home network may be obtained at step S6010. For example, when a user registered at first home network 100 visits an unregistered home network (e.g., second home network 300), associated user equipment 400 obtains hardware information of smart devices in second home network 300. The hardware information may include a serial number, a model name, a manufacturer, and so forth.

At step S6030, a smart device list of the unregistered home network may be transmitted. For example, user equipment 400 transmits a list of smart devices 310A to 310C in the unregistered home network (e.g., second home network 300) to service server 200. Furthermore, user equipment 400 also transmits user identification information (e.g., user equipment 400 or an associated user) and network identification information of the unregistered home network (e.g., second home network 30) to service server 200.

At step S6050, a registered home network may be identified. For example, receiver 211 of service server 200 receives user identification information from user equipment 400 and processor 220 of service server 200 identifies a registered home network (e.g., first home network 100) based on the received user identification information.

At step S6070, smart device information of the registered home network may be obtained. For example, processor 220 of service server 200 obtains smart device information of the registered home network (e.g., first home network 100) from database in memory 230.

At step S6090, determination may be made so as whether any compatible smart devices in the unregistered home network. For example, processor 220 of service server 200 determines whether any smart devices in the unregistered home network are compatible with smart devices in the registered home network (e.g., between first and second home networks 100 and 300). In order to determine, service server 200 may compare hardware information of smart devices in the unregistered home network (e.g., second home network 300) with hardware information of smart devices in the registered home network (e.g., first home network). Alternatively, processor 220 of service server 200 may obtain a compatible device list of the unregistered home network, which is previously created and stored in memory 230.

When no smart device is compatible (No—S6090), an inform message may be transmitted at step S6110. For example, service server 200 may transmit, to user equipment 400, the inform message for noticing an associated user that there is no device is controllable in the unregistered home network. Accordingly, the associated user is aware of no device controllable in the unregistered home network (e.g., second home network 300) and manually controls devices in the visiting home network.

When at least one compatible smart device is found in the unregistered home network (Yes—S6090), a compatible smart device list may be generated and transmitted at step S6130. For example, processor 220 of service server 200 generates a compatible smart device list including information on controllable smart devices in the unregistered home network and transmits the generated compatible smart device list to the user equipment 400. Based on such a compatible smart device list, an associated user can be aware of controllable smart devices in the unregistered home network.

At step S6150, an inquiry message may be transmitted for determining a type of providing a registered operation environment to an unregistered home network. For example, service server 200 transmits an inquiry message to user equipment 400 for inquiring an associated user of a type of providing an operation environment of the registered home network (e.g., first home network 100) to the unregistered home network (e.g., second home network 300). In particular, service server 200 may transmit signals of a graphic user interface for enabling an associated user to choose one of a system image, a management interface, and a virtual machine.

At step S6170, a response message with a decided type of providing a registered operation environment may be transmitted. For example, user equipment 400 receives the inquiry message from service server 200 and displays the message (e.g., a graphic user interface) through a display thereof to an associated user. User equipment may receive a user input with the virtual machine as a decided type of providing the operation environment. User equipment 400 generates the response message with a request of the virtual machine and transmits the generated response message to service server 200.

At step S6190, a procedure of providing a virtual machine may be initiated in response to the response message. For example, service server 200 receives the response message from user equipment 400 and initiates the procedure of providing a virtual machine based on information included in the response message.

At step S6210, corresponding smart devices in the registered home network may be selected. For example, service server 200 selects smart devices in the registered home network, which are corresponding to the determined compatible smart devices in the unregistered home network.

At step S6230, system images of the selected smart devices may be obtained. For example, service server 200 fetches system images of the selected smart devices from smart device information of the registered home network (e.g., first home network 100) stored in memory 230 of service server 200.

At step S6250, a virtual machine of each one of the determined compatible smart devices may be generated. For example, service server 200 generates a virtual machine of each one of the determined compatible smart devices in the unregistered home network. The virtual machine of each compatible smart device may include a corresponding system image and a user interface for controlling a compatible smart device.

That is, service server 200 generates a virtual machine that includes the obtained system images and a user interface for controlling smart devices where the obtained system images are installed. Furthermore, service server 200 may include identification information of smart devices to control in the user interface.

At step S6270, the generated virtual machine may be transmitted. For example, service server 200 transmits the generated virtual machine to user equipment 400.

At step S6290, the virtual machine may be installed at user equipment. For example, user equipment 400 receives the virtual machine from service server 200 and installs the virtual machine. That is, user equipment 400 stores a plurality of system images of the determined compatible smart devices in the unregistered home network and installs a user interface associated with the system images. The virtual machine may be a software program that enables a user to control an operating environment of the compatible smart devices in the unregistered home network 300. When the virtual machine is installed in user equipment 400, user equipment 400 is installed with at least one of an independent platform, an operating system, and an application for controlling an operation environment of target smart devices in the unregistered home network.

At step S6310, a user input may be received through the user interface of the virtual machine. For example, user equipment 400 receives, from an associated user, requests for using or controlling at least one of the compatible devices through a user interface included in the virtual machine.

At step S6330, at least one compatible smart device to control may be selected and a system image thereof may be obtained. For example, user equipment 400 selects at least one compatible smart device to control based on the user input received through the user interface of the virtual machine. Then, user equipment 400 obtains system images of the selected compatible smart device from a plurality of the stored system images through the virtual machine.

At step S6350, a device control message may be generated and transmitted. For example, user equipment 400 obtains device identification information of the selected compatible devices, generates a device control message including the obtained device information and the system image thereof, and transmit the generated device control message to a gateway (e.g., gateway 320) of the unregistered home network (e.g., second home network 300).

At step S6370, an installation instruction message may be generated and transmitted. For example, second gateway 320 receives the device control message from user equipment 400. Based on information included in the device control message, second gateway 320 extracts the system images and the device identification information from the device control message from user equipment 400. Second gateway 320 generates an installation instruction message based on the extracted information, transmits the installation instruction message to the designated compatible smart devices in the unregistered home network corresponding to the device identification information.

At step S6390, a system image may be installed. For example, the designated compatible smart device (e.g., smart device 310) in the unregistered home network receives the installation instruction message from second gateway 320. The designated compatible smart device installs the system image included in the installation instruction message to provide the same operation environment of the registered home network to the associated user in the unregistered home network.

After installing the system image in the designated smart devices in the unregistered home network, the designated compatible smart devices in the unregistered home network have the same operating environment of the registered home network. Accordingly, the associated user is enabled to use and/or to control the designated compatible smart devices in the unregistered home network with the same operation conditions of the registered home network in accordance with at least one embodiment.

At step S6410, a control signal may be transmitted. For example, user equipment 400 receives commands (e.g., user inputs) from the associated user through the user interface generated by the virtual machine installed in user equipment 400, generates control signals based on the received commands, and transmits the generated control signals to one of the designated compatible smart device in the unregistered home network through second gateway 320.

At step S6430, a designated operation may be performed based on the control signals. For example, one of the designated compatible smart devices (e.g., smart device 310) may receive the control signals from user equipment 400 through second gateway 320 and performs a designated operation based on the control signals.

At step S6450, a restoration message may be transmitted upon generation of a predetermined event. For example, when user equipment 400 exits from a service area of the unregistered home network (e.g., second home network 300) or when user equipment 400 receives a message for interrupting to use the designated compatible devices in the unregistered home network (e.g., second home network 300) through the user interface of the virtual machine, user equipment 400 transmits a restoration message to service server 200.

At step S6470, a deletion instruction message may be transmitted. For example, service server 200 receives the restoration message from user equipment 400 and generates and transmits a deletion instruction message to second gateway 200 in response to the restoration message. The deletion instruction message may include information on device identifiers of the designated compatible smart devices installed with corresponding system images.

At steps S6490, smart devices installed with the system images may be identified. For example, second gateway 320 receives the deletion instruction from service server 200 and identifies designated smart devices installed with the system images based on the device identifiers included in the deletion instruction message.

At step S6510, a deletion instruction message may be transmitted. For example, second gateway 320 transmits the deletion instruction message to the identified smart devices.

At step S6530, the installed system image may be deleted and an original operation environment may be restored. For example, the identified smart devices receive the deletion instruction message from second gateway 320. In response to the deletion instruction message, each one of the identified smart devices restores the original operation environment by deleting the installed system image.

At step S6550, a deletion completion message may be transmitted. For example, the designated smart devices in the unregistered home network generates a deletion completion message after restoring the original operation environment and transmit the generated deletion completion message to user equipment 400 through second gateway 320.

At step S6570, a corresponding virtual machine may be deleted. For example, user equipment 400 receives a deletion completion message from second gateway 320 and deletes the corresponding virtual machine installed in user equipment 400.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of providing an operation environment of a registered network having first devices to a user in an unregistered network having second devices, the method comprising:
   detecting the second devices in the unregistered network when user equipment associated with the user enters a service area of the unregistered network;
   as compatible devices, selecting devices compatible with the first devices in the registered network from the detected second devices;
   obtaining system images of the first devices compatible with the selected compatible devices;
   installing the obtained system images of the first devices at the selected compatible devices, respectively;
   generating a user interface for enabling the user to control at least one of the compatible devices; and
   transmitting the generated user interface the user equipment,
   wherein the user equipment provides the user interface, receives a user input to control the at least one of the compatible devices through the user interface, and controls the at least one of the compatible devices installed with the system image and in the unregistered device based on the received user input by generating a control signal based on the user input and transmitting the generated control signal to the at least one of the compatible devices.

2. The method of claim 1, wherein the detecting comprises:
   receiving second device information on the second devices in the registered network; and
   extracting a list of the second devices, user identification information associated with the user equipment, network identification information associated with the registered network.

3. The method of claim 1, wherein the selecting devices comprises:
   identifying the registered network based on user identification information associated with the user equipment;
   obtaining first device information of the registered network based on the identified registered network; and
   selecting the compatible devices from the second devices based on the obtained first device information of the registered network and second device information received from the user equipment.

4. The method of claim 3, wherein:
   the first device information includes hardware information and operation information of the first devices in the registered network;
   the second device information includes hardware information and operation information of the second devices in the unregistered network;
   the hardware information includes information on a serial number, a model name, and a manufacturer of a respective device; and
   the operation information includes information on an operating system, a license of the operating system, device and operation settings, programs, and files of a respective device.

5. The method of claim 1, wherein the obtaining system images comprises:
   transmitting an inquiry message to the user equipment for requesting the user to choose a type of providing the operation environment of the registered network;
   receiving a response message from the user equipment in response to the inquiry message; and
   performing a procedure of installing a system image when the response message indicates system image installation as the type of the providing the operation environment.

6. The method of claim 1, wherein the installing the obtained system images of the first devices comprises:
   transmitting an installation instruction message with the obtained system images of the first devices to a gateway of the unregistered network,
   wherein the gateway of the unregistered network identifies the compatible devices in the unregistered network based on identifiers of the compatible devices in the installation instruction message and transmits an installation message and a corresponding system image to a respective one of the identified compatible devices.

7. The method of claim 1, after the installing the obtained system images, comprising:
   receiving a restoration message from the user equipment; and
   transmitting a deletion instruction message to a gateway of the unregistered network,
   wherein the gateway of the unregistered network identifies second devices installed with the system images of the first devices in the registered network based on information included in the deletion instruction message and controls the identified second devices to restore an original operation environment by deleting the installed system image.

8. The method of claim 1, prior to the detecting the second devices, comprising:
   receiving device information on devices in a corresponding network from a gateway of the corresponding network upon generation of a predetermined event,
   wherein the device information includes hardware information, operation information, and a system information of each device in the corresponding network.

9. The method of claim 8, wherein the gateway is configured to:
   search for devices supporting an associated network service in the corresponding network;

collecting the hardware information of the searched devices through communication with the searched devices;
obtaining the operation information of the searched devices through communication with the searched devices;
generating system images of the searched devices based on the collected hardware information and the obtained operation information;
generating the device information of the searched devices by including the hardware information, the operation information, and the generated system images of the searched devices; and
transmitting the generated device information with network identification information of the corresponding network to a service server.

10. A method of providing, by a service server, an operation environment of a first home network having first smart devices to a user visiting a second home network having second smart devices, the method comprising:
detecting the second smart devices in the second home network when user equipment associated with the user enters a service area of the second home network;
as compatible smart devices, selecting smart devices compatible with the first smart devices in the first home network from the detected second smart devices;
generating a management interface for managing the selected compatible smart devices in the second home network;
transmitting the generated management interface to the user equipment;
receiving a request of using one of the selected compatible smart devices from the user equipment;
identifying one of the first smart devices in the first home network corresponding to the requested compatible smart device based on the received request;
obtaining a system image of the identified first smart device as a system image of the requested compatible smart device; and
transmitting an installation instruction message with the obtained system image to a second gateway of the second home network,
wherein the second gateway performs:
receiving the installation instruction message from the service server;
determining target smart devices to install a system image and obtaining corresponding system images from the received installation instruction message;
transmitting an installation instruction message to the determined target smart devices with the obtained corresponding system images.

11. The method of claim 10, prior to the generating a management interface, comprising:
transmitting an inquiry message to the user equipment for requesting the user to choose a type of providing the operation environment of the registered network;
receiving a response message from the user equipment in response to the inquiry message; and
performing a procedure of providing the management interface when the response message indicates the management interface as the type of the providing the operation environment.

12. The method of claim 10, comprising:
by one of the target smart devices, receiving the installation instruction message from the second gateway;
by the one of the target smart devices, extracting a system image from the installation instruction message; and
by the one of the target smart device, installing the extracted system image.

13. A method of providing, by a service server, an operation environment of a first home network having first smart devices to a user visiting a second home network having second smart devices, the method comprising:
detecting the second smart devices in the second home network when user equipment associated with the user enters a service area of the second home network;
as compatible smart devices, selecting smart devices compatible with the first smart devices in the first home network from the detected second smart devices; and
providing a virtual machine for managing the selected compatible smart devices in the second home network,
wherein the user equipment performs:
receiving the virtual machine from the service server;
installing the received virtual machine in the user equipment;
providing the user interface for controlling the selected compatible smart device to the user;
receiving a user input through the user interface of the installed virtual machine;
selecting at least one compatible smart device to control based on the user input;
obtaining a system image of the selected at least one compatible smart device from a plurality of the stored system images through the virtual machine;
obtaining device identification information of the selected at least one compatible smart device;
generating a device control message including the obtained device identification information and the obtained system image; and
transmitting the device control message to a second gateway of the second home network.

14. The method of claim 13, prior to the providing a virtual machine, comprising:
transmitting an inquiry message to the user equipment for requesting the user to choose a type of providing the operation environment of the registered network;
receiving a response message from the user equipment in response to the inquiry message; and
performing a procedure of providing the virtual machine when the response message indicates the virtual machine as the type of the providing the operation environment.

15. The method of claim 13, wherein the providing a virtual machine comprises:
selecting first smart devices corresponding to the selected compatible second smart devices from the first smart devices in the first home network;
obtaining system images of the selected first smart devices from smart device information of the first home network;
generating the virtual machine of each one of the selected compatible smart devices by including the obtained system images and a user interface for controlling the selected compatible smart devices; and
transmitting the generated virtual machine to the user equipment.

16. The method of claim 13, by the second gateway, comprising;
receiving the device control message from the user equipment;
determining target smart devices to install a system image based on the device identification information included in the device control message; and obtaining corresponding system images from the received device control message;

generating an installation instruction message for each one of the determined target smart devices to include a corresponding one of the obtained system images; and transmitting the generated installation instruction messages to the determined target smart devices, respectively.

* * * * *